(12) United States Patent
Thompson et al.

(10) Patent No.: US 7,670,212 B1
(45) Date of Patent: Mar. 2, 2010

(54) METHOD OF TRIMMING PORTION OF CHICKEN PAW METATARSAL PAD USING POWER OPERATED ROTARY KNIFE

(75) Inventors: Troy Thompson, Cassville, MO (US); David C. Ross, Elyria, OH (US); Jeffrey Alan Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 12/359,538

(22) Filed: Jan. 26, 2009

(51) Int. Cl.
*A22C 17/12* (2006.01)
(52) U.S. Cl. ..................................... 452/133
(58) Field of Classification Search ......... 452/129–133, 452/166, 167, 198
See application file for complete search history.

(56) References Cited

U.S. PATENT DOCUMENTS

| | | | |
|---|---|---|---|
| 3,696,464 A * | 10/1972 | Dillon et al. | 452/167 |
| 4,709,448 A * | 12/1987 | McGuire et al. | 452/167 |
| 5,462,477 A * | 10/1995 | Ketels | 452/135 |
| 6,716,096 B2 * | 4/2004 | Clark | 452/106 |
| 6,749,497 B2 * | 6/2004 | Haley et al. | 452/167 |

OTHER PUBLICATIONS

Six pages of photographs of a Model 350M2 power operated rotary knife and a Model 350 cone-shape rotary knife blade manufactured and sold by Betther Industries, Inc. ("Bettcher"), the assignee of the present application. The Bettcher Model 350M2 rotary knife and the Model 350 cone blade shown in the photographs substantially conform to the rotary knife and cone blade described in the present application. The Bettcher Model 350M2 rotary knife and the Model 350 cone blade were sold by Bettcher more than one year prior to the filing date of the present application and are acknowledged as prior art to the present application.

Two page article entitled "Chicken Feet—Incubation and Embryology—University of Illinois", copyright 2008 University of Illinois Board of Trustees, print out from web site http://www.urbanextuluc.edu/eggs/res13-feet.html on Oct. 16, 2008.

Seventeen page article entitled "China, Peoples Republic of—Poultry and Products—Chicken Paw, Wing and Wing Tip Exports to China—2007", USDA Foreign Agricultural Service GAIN Report (Global Agricultural Information Network), date Feb. 7, 2007, GAIN Report No. CH7006, Prepared by Casey Bean, Joseph Jacobson and Suzanne Ryan, Approved by Maurice House, U.S. Embassy.

* cited by examiner

*Primary Examiner*—Thomas Price
(74) *Attorney, Agent, or Firm*—Tarolli, Sundheim, Covell & Tummino LLP

(57) ABSTRACT

A method for trimming an undesirable portion of a metatarsal pad of a chicken paw using a power operated rotary knife. The steps of the method include: a) providing a power operated rotary knife including an annular knife blade rotatable about a central axis and defining a central open area; moving one of the rotary knife and the chicken paw with respect to the other to position the rotary knife with respect to a bottom of the chicken paw such that the undesirable portion of the metatarsal pad is within the central open area of the blade and the cutting edge of the blade is proximate to a periphery of the undesirable portion; and moving one of the rotary knife and the chicken paw such that the cutting edge of the blade slices a layer of the metatarsal pad thereby removing at least part of the undesirable portion.

21 Claims, 10 Drawing Sheets

METHOD OF TRIMMING PORTION OF CHICKEN PAW METATARSAL PAD USING POWER OPERATED ROTARY KNIFE

FIELD OF THE INVENTION

The present invention relates to a method of processing chicken paws using a power operated rotary knife and, more specifically, a method of trimming an undesirable portion of a metatarsal pad of a chicken paw using a power operated rotary knife.

BACKGROUND

Power operated rotary knives have been used in commercial meat processing operations to trim fat and connective tissue from meat, trim pieces of meat from bones, and to produce meat slices. Such knives usually comprise a handle, blade housing and a rotary knife blade. The knife operator wields the knife relatively freely at a meat cutting work station that is remote from a driving motor.

In many countries of the world, for example, China, chicken feet and paws are a staple food item. As generally used, a chicken paw is a portion of the lower leg (metatarsus) of a chicken, while chicken foot or chicken feet typically includes the chicken paw plus a portion of the shank of the leg of the chicken. In FIG. 1, a chicken is shown generally at 10, a chicken paw is shown generally at 12, while a chicken foot is shown generally at 14. As can be seen, the chicken foot 14 includes a portion of a shank 16 of a chicken leg 18. For purposes of this application, both chicken paws 12 and chicken feet 14 will be referred to generally as chicken paws 12.

According to the USDA, China imports approximately 300,000 to 350,000 metric tons of chicken feet and chicken paws per year and the U.S. is the single largest chicken paw supplier to China. USDA Foreign Agriculture Service GAIN Report (Global Agriculture Information Network), GAIN Report Number CH7006, Date: Feb. 7, 2007, Peoples Republic of China—Poultry and Products—Chicken Paw, Wing and Wing Tip Exports to China 2007, by Casey Bean, Joseph Jacobson and Suzanne Ryan. The price paid for chicken paws depends, among other things, on the quality of the paws. The quality of a chicken paw 12 is dependent on a number of factors, one of which is the presence or absence of damaged or discolored regions of the paw.

The metatarsal pad, shown generally at 20 in FIGS. 1-3, is a large, central fleshy pad located at on a bottom of the paw 12 at the end of the tarsometatarsal bone (not shown). A generally planar, lower surface 22 of the metatarsal pad 20 contacts a ground or surface 24 when the chicken 10 walks or stands. The metatarsal pad 20 contacts the ground when the chicken walks and extends between the metatarsal fold 26 and the bases of the three toes 28, 30, 32. The metatarsal pad 20 is highly desired because of its food value. However, the ground or surface 24 that chickens walk or stand on is often covered in highly acidic chicken manure. Therefore, a portion 34 of the metatarsal pad 20, generally corresponding to the planar, ground contacting portion 22 of the pad 20, will often be damaged and/or discolored due to the acidic action of chicken manure on the pad 20 during the life of the chicken 10. A damaged and/or discolored portion (shown in dashed line as 34 in FIG. 3) of a metatarsal pad 20 will be generally referred to herein as the undesirable portion 34 of the metatarsal pad 20. If a lot of chicken paws 12 is being processed, failure to completely remove the undesirable portion 34 of each metatarsal pad 20 may result in: a) a reduction in the quality grade that the lot of chicken paws would otherwise receive; and/or b) a rejection of the entire lot of chicken paws.

Accordingly, it is desired to remove the undesirable portion 34 of the metatarsal pad 20 during processing of the chicken paw 12. At the same time, since the metatarsal pad 20 is highly desired for its food value and contributes to the weight of the chicken paw 12, it is desired that trimming of the metatarsal pad 20 be kept to a minimum necessary to remove the undesirable portion 34 of the pad 20 while leaving the remaining undamaged portion 36 of the pad. Typically, the undesirable portion 34 constitutes a relatively thin layer adjacent the ground contacting surface 22 of the metatarsal pad 20, so it desired to remove a thin layer of the pad 20 to remove the undesirable portion 34 completely while still leaving as much of the underlying undamaged portion 36 of the pad 20 intact as possible.

Hand trimming of the metatarsal pad 20 using straight or curved knives or another tool, such as a cheese grater, is both slow and laborious. Additionally, hand trimming is prone to either: 1) trimming substantially more of the undamaged portion 36 of the metatarsal pad 20 than necessary to remove the undesirable portion 34 of the pad; or 2) incomplete removal of the undesirable portion 34 of the pad 20.

What is desired is a method of trimming an undesirable portion of a metatarsal pad of a chicken paw that is faster than hand trimming, suitable for use by operators with minimal training, easier and more ergonomically correct than hand trimming, and that facilitates trimming the undesirable portion of the metatarsal pad without substantial removal of undamaged portions of the metatarsal pad.

SUMMARY OF THE INVENTION

In one aspect, the present invention concerns a method for trimming an undesirable portion 34 of a metatarsal pad 20 of a chicken paw 12 using a power operated rotary knife 100. The method features the steps of: providing a power operated rotary knife 100 including an annular knife blade 118 rotatable about a central axis A-A or V-V of the blade 118 and defining a central open area CO, a blade housing 114 supporting the blade 118 for rotation about the blade central axis V-V, and a handle assembly 112 extending from the blade housing 114 including a drive member 126 engaging and rotating the blade 118, the blade 118 including an annular body 118a with a blade section 118c at a first axial end 118b of the blade 118 and gear teeth engaged by the blade housing drive member at a second axial end of the blade, the blade section including a lip extending below a lower surface of the blade housing and radially inwardly toward the blade central axis, the lip defining a radially inner surface having cutting edge at a distal end.

The method further features the steps of: moving one of the rotary knife and the chicken paw with respect to the other to position the rotary knife with respect to a bottom of the chicken paw such that the undesirable portion of the metatarsal pad is within the central open area of the blade and the cutting edge of the blade is proximate to a periphery of the undesirable portion; and moving one of the rotary knife and the chicken paw with respect to the other such that the cutting edge of the blade slices a layer of the metatarsal pad thereby removing at least part of the undesirable portion. The alignment of the periphery 34c of the undesirable portion 34 of the pad with the cutting opening CO defined by the cutting edge 118h of the blade 118 is shown schematically in FIGS. 12 and 13. Successive views showing the progression of trimming of the undesirable portion 34 to generate the trimmed layer 40 removed from the pad 20 is shown schematically in FIGS. 14-16. The resulting trimmed layer 40 is shown schematically in FIGS. 17A & 17B.

If upon inspection, the undesirable portion has not been completely removed, repeating the steps of: moving one of the rotary knife and the chicken paw to position the rotary knife with respect to the bottom of the chicken paw such that a remaining residual portion of the undesirable portion of the metatarsal pad is within the central open area of the blade and the cutting edge of the blade is proximate to a periphery of the remaining residual portion of the undesirable portion; and moving one of the rotary knife and the chicken paw with respect to the other such that the cutting edge of the blade slices a layer of the metatarsal pad thereby removing at least part of the remaining undesirable portion.

In one exemplary embodiment, the chicken paw is stationary and the rotary knife is moved with respect to the chicken paw and movement of the rotary knife is in a direction of movement that is substantially orthogonal to the central axis of the blade and substantially parallel to a plane defined by the bottom of the chicken paw.

In another exemplary embodiment, the rotary knife is stationary and the chicken paw is moved with respect to the rotary knife and movement of the chicken paw is in a direction of movement that is substantially orthogonal to the central axis of the blade and substantially parallel to a plane defined by the bottom of the chicken paw.

In yet another exemplary embodiment, both the rotary knife and the chicken paw are moved.

These and other objects, features and advantages of the invention will become better understood from the detailed description of the preferred embodiments of the invention which are described in conjunction with the accompanying drawings.

DETAILED DESCRIPTION

A power operated rotary knife of the present invention is shown generally at 100 in FIGS. 4-9. The knife 100 comprises a handle assembly 112, a generally ring-shaped, split blade housing 114 supported by the handle assembly 112, and an annular knife blade 118 supported by the blade housing 114 for rotation about an center axis of rotation A-A. The illustrated knife is connected to a remote electric motor by a flexible drive shaft so that the blade 118 is driven from the electric motor at a suitably high RPM (e.g. 2000 RPM) for cutting and trimming purposes. The motor and drive shaft may be of any suitable or conventional construction and are not illustrated. It should be appreciated that other means may be employed to drive the blade 118. For example, an air motor may be mounted in the handle assembly 112 and connected to a source of pressurized air via a suitable hose, or an electric motor may be mounted in the handle assembly 112 and connected to a power source by a power cord. It is the intent of the present invention to cover all such drive systems.

Figure 1:
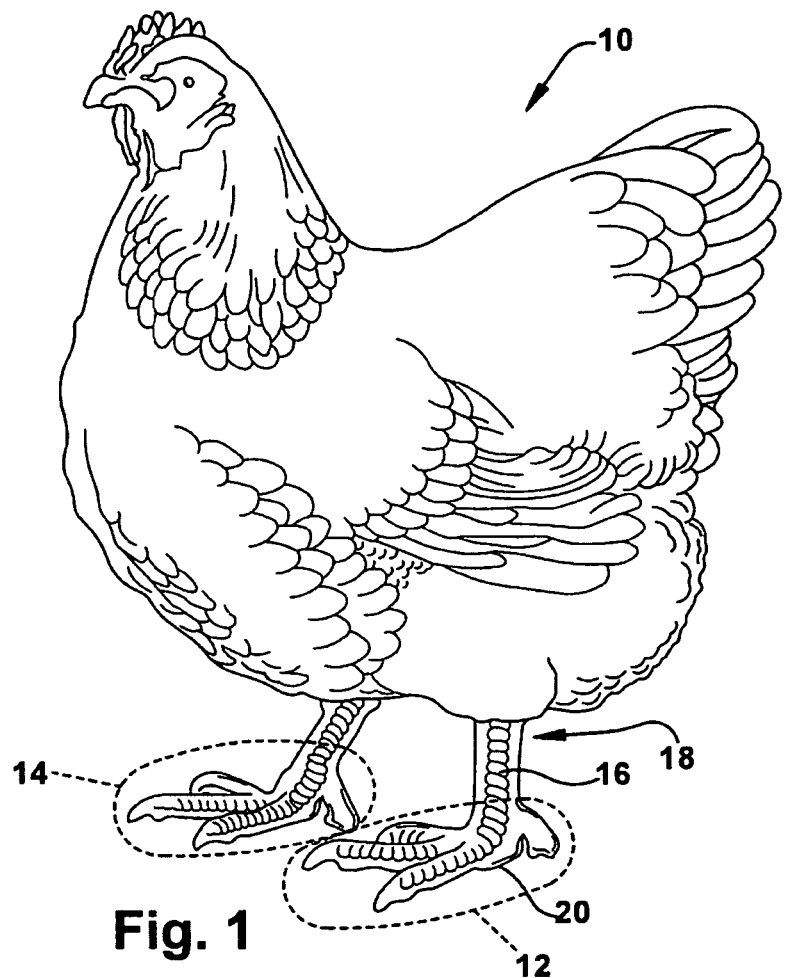
FIG. 1 is a perspective view of a chicken, showing two chicken paws of the chicken.
Figure 2:
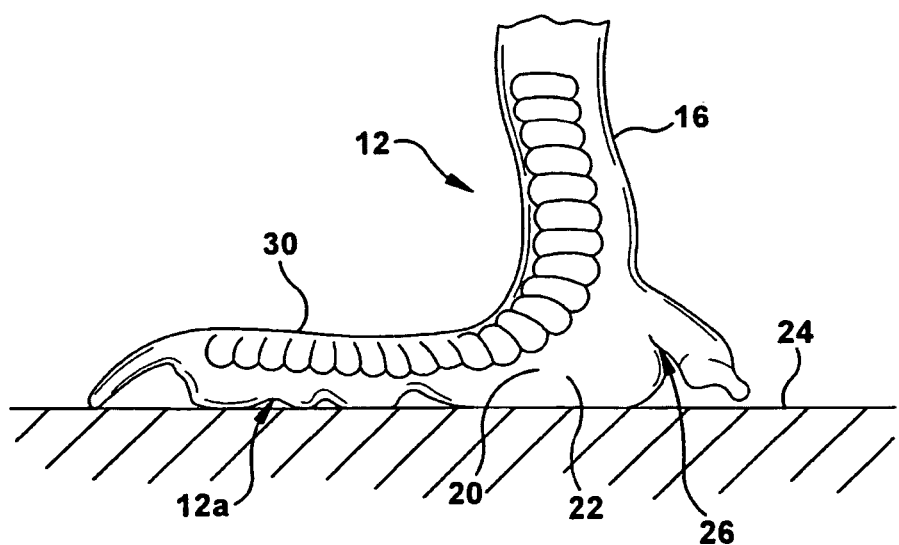
FIG. 2 is a longitudinal sectional view of a chicken paw.
Figure 3:
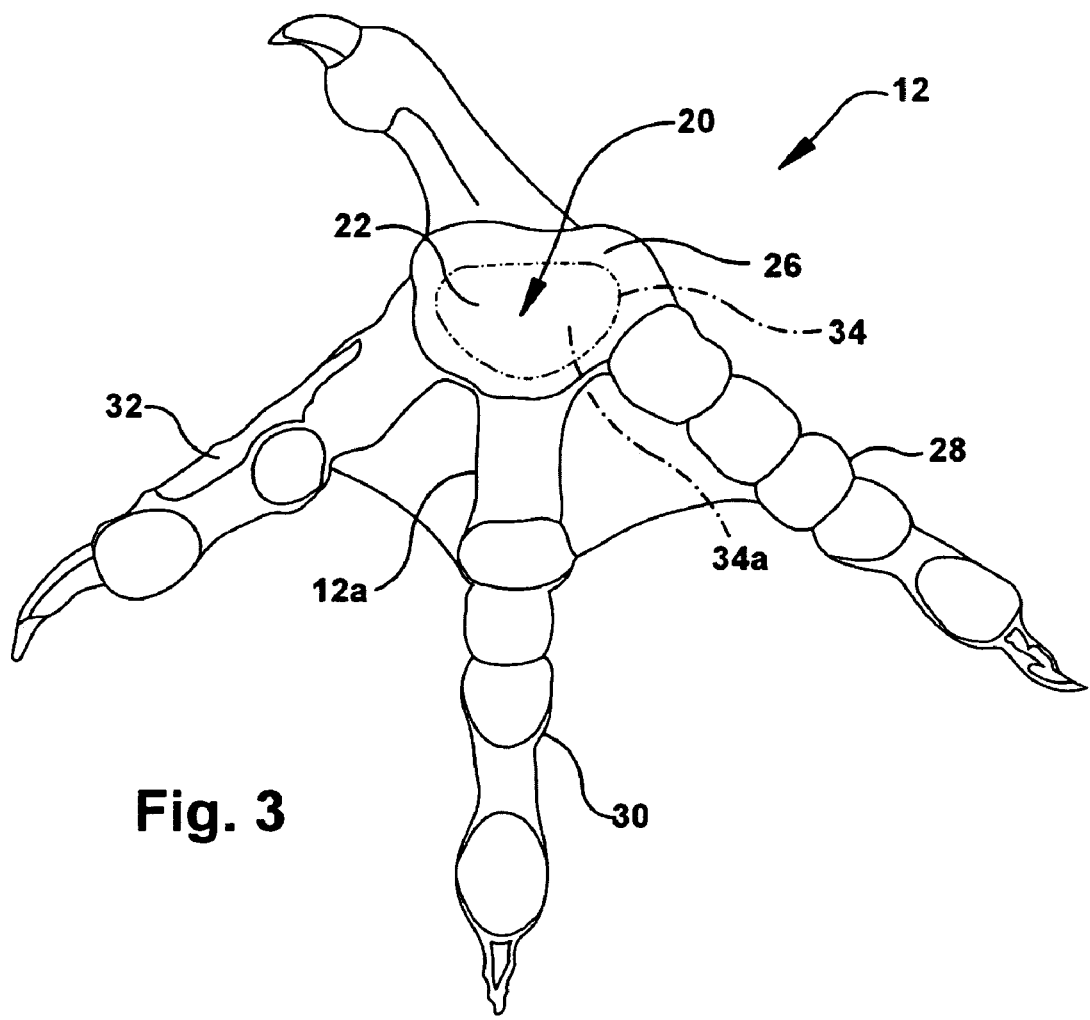
FIG. 3 is a bottom plan view of the chicken paw of FIG. 2.
Figure 4:
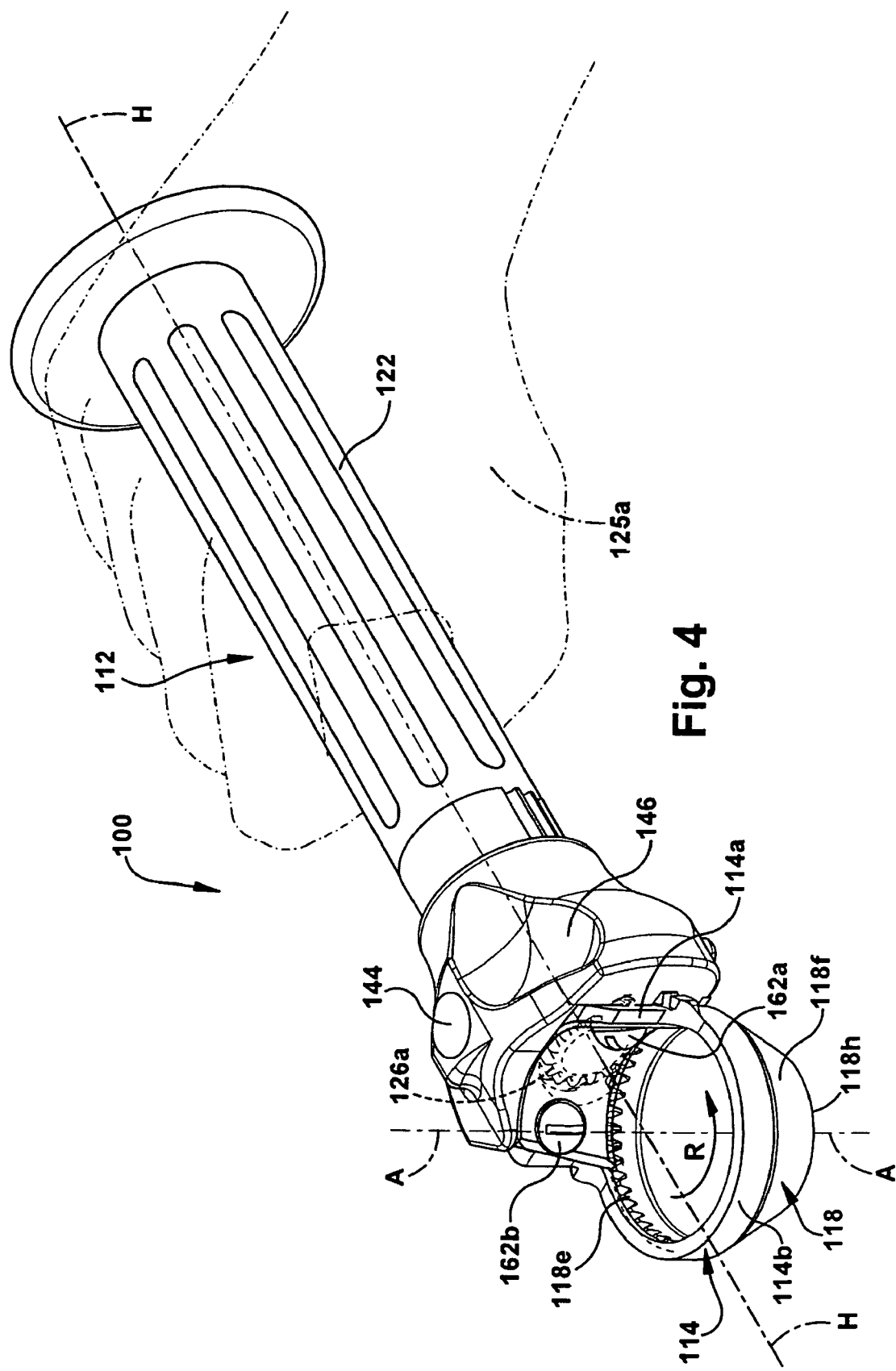
FIG. 4 is a schematic perspective view of a rotary knife of the present invention with a pinion gear cover removed to show the drive gear interaction between a plurality of gear teeth of the rotary blade and drive teeth of a pinion gear.
Figure 5:
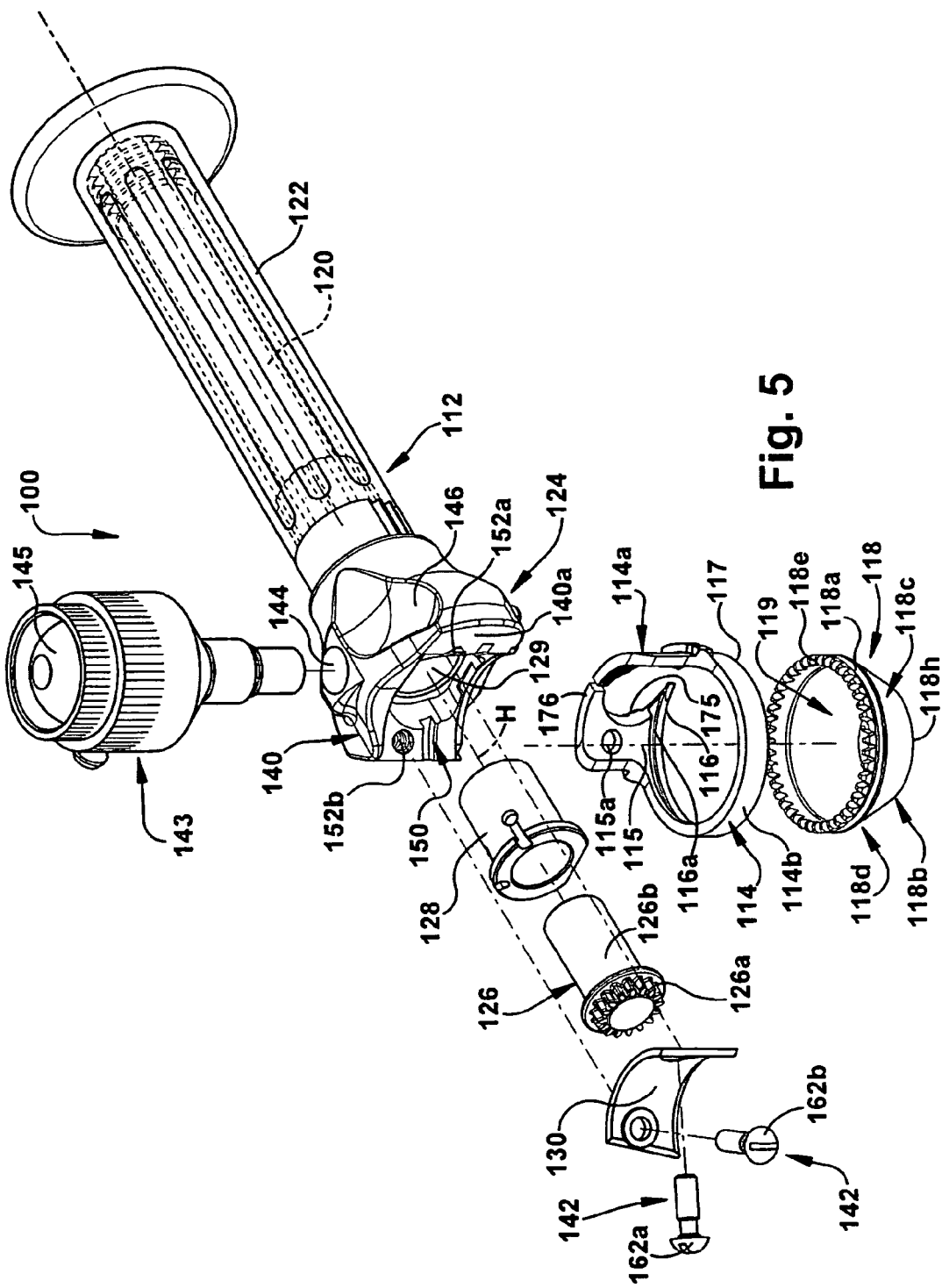
FIG. 5 is a schematic exploded perspective view of the rotary knife of FIG. 4.
Figure 6:
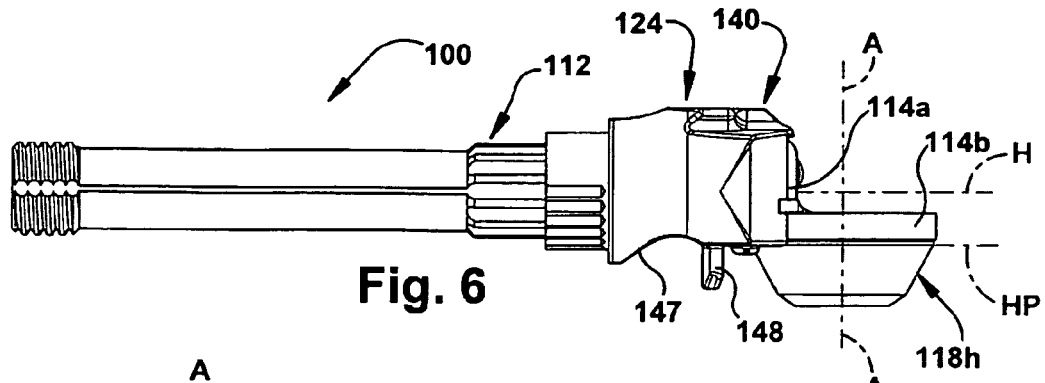
FIG. 6 is a schematic right side elevation view of the rotary knife of FIG. 4.
Figure 7:
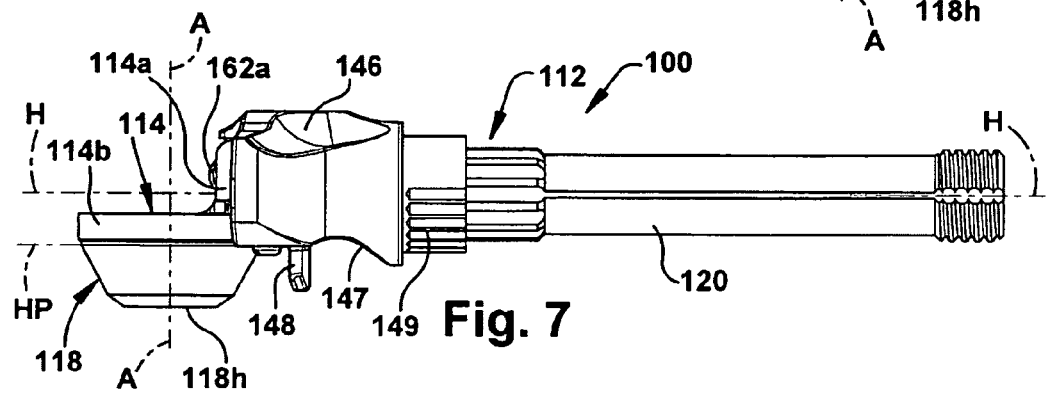
FIG. 7 is a schematic left side elevation view of the rotary knife of FIG. 4.
Figure 8:
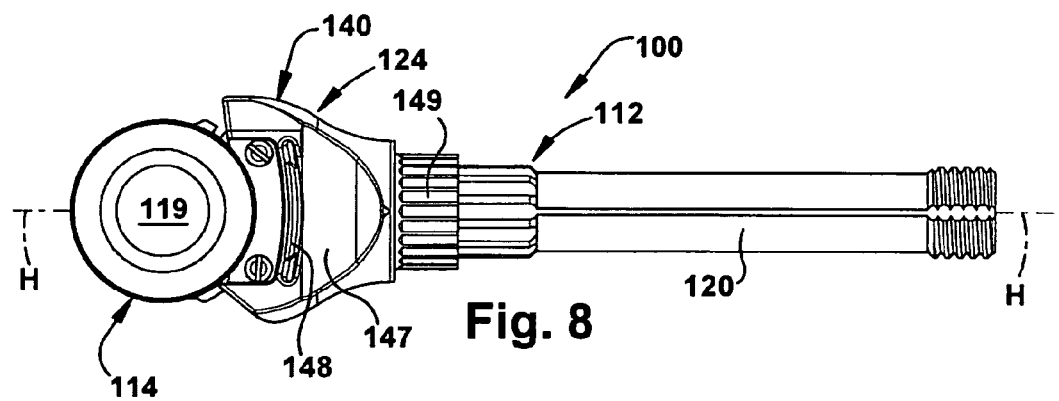
FIG. 8 is a schematic bottom plan view of the rotary knife of FIG. 4.
Figure 9:
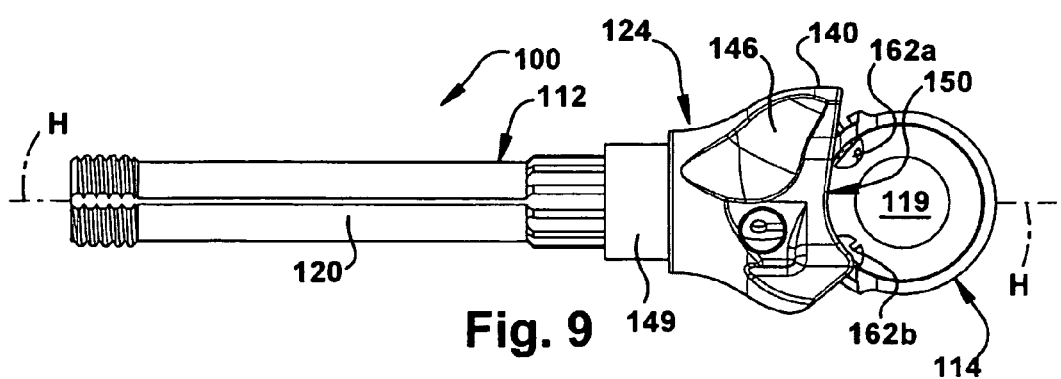
FIG. 9 is a schematic top plan view of the rotary knife of FIG. 4.
Figure 10:
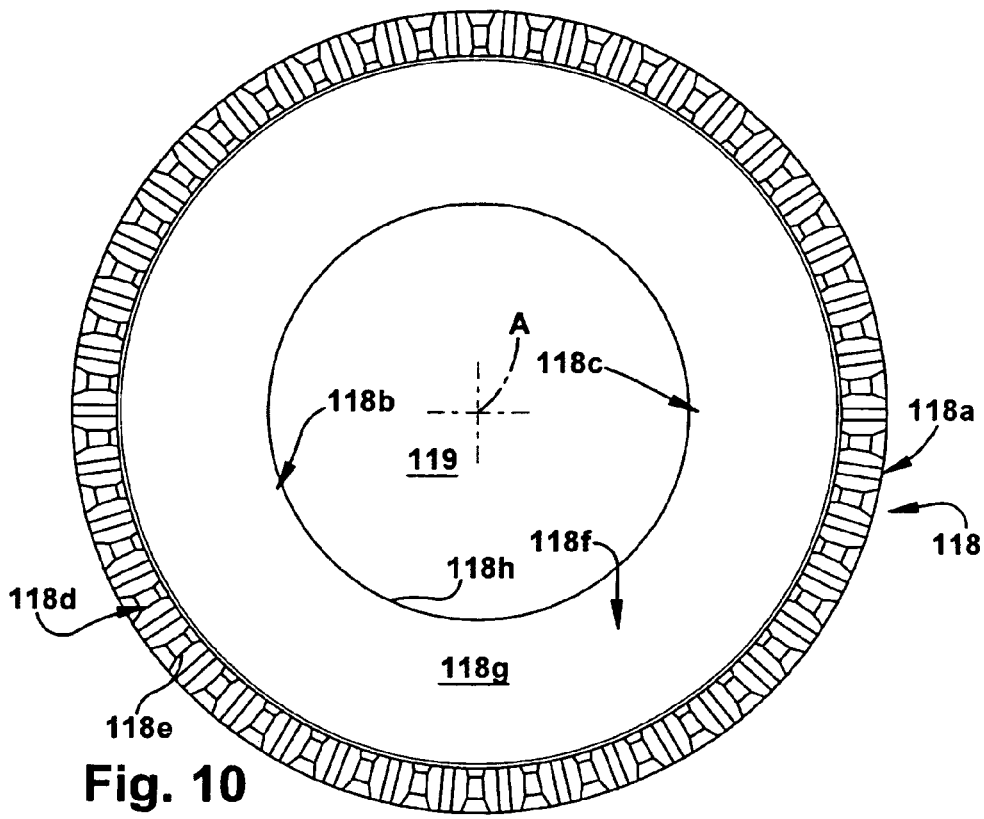
FIG. 10 is a schematic top plan view of a cone shape rotary blade of the present invention used in the rotary knife of FIG. 4.
Figure 11:
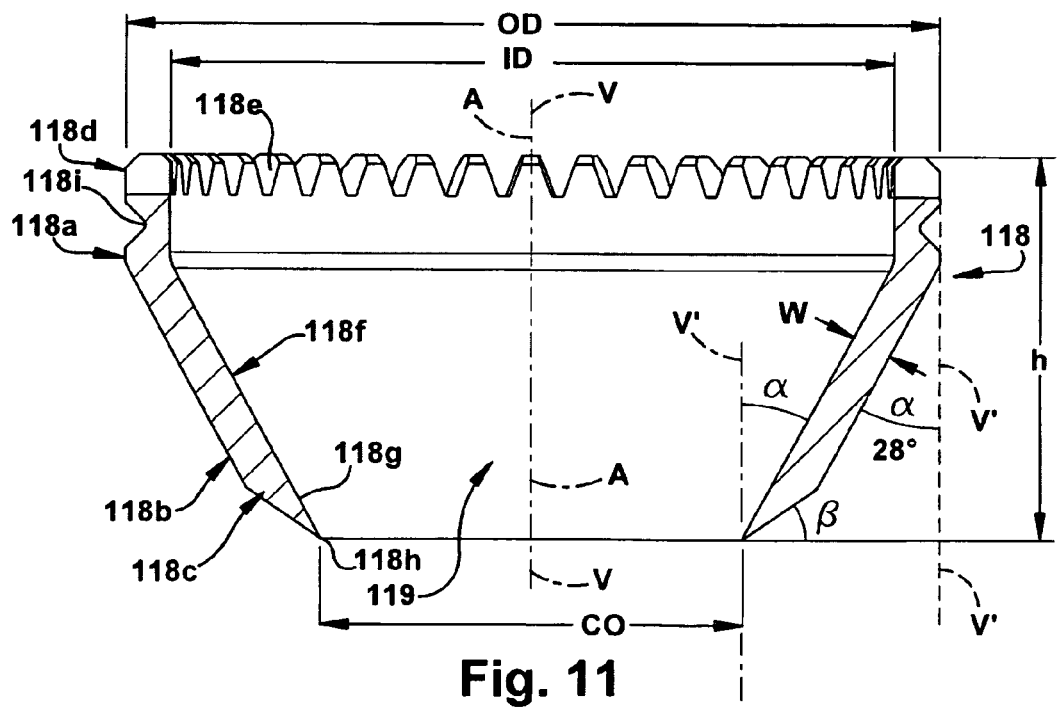
FIG. 11 is a schematic longitudinal sectional view of the rotary blade of FIG. 10.

As best seen in FIGS. 10 and 11, the annular knife blade 118 includes an annular body 118a defining a central open portion 119. At a first axial end 118b of the annular body 118a is a blade section 118c that extends downwardly and radially inwardly from the annular body 118a. Formed at a second axial end 118d are a plurality of gear teeth 118e which are used to rotatably drive the blade when the blade 118 is properly positioned in the blade housing 114. The gear teeth 118e are engaged by a blade housing drive member or pinion gear 126 to rotate the blade 118 when the rotary knife 100 is actuated. The cutting section or lip 118f of the blade 118 extends below a bottom surface 117 of the blade housing 114. The lip 118f defines a radially inner surface 118g having a cutting edge 118h at a distal end of the blade. As can best be seen in FIG. 11, the radially inner surface 118g of the blade 118 defines a vertical cutting angle α with respect to a central vertical axis V-V of the blade 118. The vertical axis V-V of the blade 118 is substantially congruent with the axis of rotation A-A of the blade 118.

The illustrated handle assembly 112 extends away from the blade 118 and blade housing 114 along a centerline H-H that bisects the blade 118 and blade housing 114 and which is transverse (substantially perpendicular) to the axis of rotation A-A of the blade 118 thereby allowing a knife operator to comfortably wield the knife 100 with one hand. The handle assembly 112 comprises a handle supporting frame member 120 and a head assembly 124 fixed to the frame member 120. The head assembly 124 includes a distal head member 140 that receives and supports the blade housing 114 which, in turn, rotatably supports the blade 118.

As can be seen, the centerline H-H of the handle assembly 112 extends substantially along the frame member 120. A hand grip 122 surrounds the frame member 120 and provides a gripping surface for an operator. The frame member 120 is adapted to receive various size/style hand grips 122 having different configurations to permit an operator to select a grip which is most comfortable for the operator's hand 125a (shown in dashed line in FIG. 4) gripping the hand grip 122.

The frame member 120 rigidly supports the head assembly 124 and the blade drive member 126, which in one embodiment comprises a pinion gear 126 and a pinion gear supporting bearing 128, while providing a channel through which the flex shaft (not shown) extends to make a driving connection with the pinion gear 126. The head assembly 124 secures the blade housing 114 and the blade 118 with respect to the frame member 120 while enabling their removal and replacement when desired.

The rotary knife blade 118 is driven by a set of gear teeth 126a at one end of the pinion gear 126. The gear teeth 126a of the pinion gear 126 coact with the plurality of gear teeth 118e of the blade 118 to rotate the blade about its axis of rotation A-A. A shank 126b of the pinion gear 126 is supported for rotation in the pinion gear support bearing 128. The pinion gear bearing 128 is a tubular member that is fixed and supported within an appropriate sized cylindrical opening 129 (FIG. 5) in the head member 140 of the head assembly 124.

The illustrated head assembly 124 comprises a head member 140 and a clamp assembly 142 that detachably clamps the blade housing 114 and the blade 118 to the head member 140. The head assembly 124 also includes a grease cup assembly 143 which supplies a relatively viscous lubricant to the pinion gear 126, the blade 118 and the blade housing 114 via suitable passages. The grease cup assembly 143 is received in a threaded opening 144 of the head member 140. An operator depresses a rubber-like diaphragm 145 of the grease cup assembly 143 to force a flow of the lubricant into the gear teeth 126a of the pinion gear 126 from which the lubricant flows onto the blade 118 and is circulated about the blade housing 114.

The head member 140 includes a thumb support recess 146 (FIGS. 4 & 5) that is formed in the upper surface of the head member 140 to provide a support surface for the right thumb of a right handed operator. Alternately, a separate thumb support (not shown) may be mounted on a forwardly extending splined portion 149 of the handle supporting frame member 120. A bottom surface of the head member 140 includes a curved recessed region 147 (FIGS. 6, 7 & 8) to support the operator's index finger. An extending guard 148 prevents the operator's index finger from sliding forward toward the blade 118.

The head member 140 and the clamp assembly 142 position and secure the blade housing 114 relative to the handle assembly 112. The illustrated head member 140 is a generally crescent shaped, cast metal body 140a that defines a semicircular blade housing seating region 150. The clamping assembly 142 includes a pair of threaded fasteners or screws 162a, 162b that thread into threaded openings 152a, 152b of the head member 140 to secure the blade housing 114 to the head member 140. An arcuate pinion gear cover 130 includes a pair of openings and is interposed between the fasteners 162a, 162b and the head member 140 to cover the pinion gear 126 and protect it from debris generated during the trimming process. In one embodiment, the pinion gear 126 drives the blade 118 in the direction R (FIG. 4) which is counterclockwise CCW when viewed from above by the operator.

Advantageously, in the knife 100 of the present invention, the blade 118 may be removed and replaced without the necessity of removing the blade housing 114. The blade housing 114 forms a split ring-like structure that comprises an axially extending mounting section 114a and an annularly curved body section 114b extending from a lower portion 115 of the mounting section 114a. The mounting section includes a circular opening 115a though which the second clamp assembly screw 162b extends and a slot (not shown) though which the first clamp assembly screw 162a extends.

The mounting section 114a is curved and secured between the clamp assembly screws 162a, 162b, the pinion gear cover 130 and the head member 140 to secure the blade housing 114 to the head assembly 124. The body section 114b is thinner in an axial direction and extends peripherally from the lower portion 115 of the mounting section 114a. Stated another way, when viewed with respect to the axis of rotation A-A of the blade 118, the body section 114b is thinner when measured along the axis A-A than the mounting section 114a. A vertical center axis of the blade housing 114 is substantially congruent with the axis of rotation A-A of the blade 118.

The blade housing 114 is split to enable resilient expansion and contraction of the blade housing diameter for removing and replacing the blade 118. To remove the blade 118 from the blade housing 114, the operator simply loosens the first clamping assembly screw 162a from the head member 140. Since the assembly screw 162a extends through a slot of the blade housing mounting portion 114a and not a circular opening like the opening 115a of the blade housing mounting portion, loosening the screw 162a sufficiently allows the blade housing 114 to expand its diameter. When the blade housing 114 is in an expanded diameter condition, the blade 118 may then be replaced with a new blade.

Since the second clamping screw 162b remains fastened to the head member 140, the blade housing 114 remains affixed to the head assembly 124 during the blade changing operation. Aligned with the centerline H-H of the handle assembly 112 is a generally semicircular recess 175 in the mounting section 114a of the blade housing 114. The recess 175 provides clearance for the pinion gear 126 and, more particularly, the pinion gear teeth 126a as the teeth engage and drive the drive teeth 118e disposed on the upper surface of the blade body 118a.

The blade 118 is support for high RPM rotation within in the blade housing 114 by a patented bearing structure. The body section 114b of the blade housing 114 includes a radially inwardly extending bearing structure 116 (best seen in FIG. 13) that bears against and rotatably supports the blade 118. The bearing structure 116 extends inwardly from an inner wall 116a of the blade housing body section 114b. The bearing structure 116 of the blade housing 114 bears against axial spaced apart bearing surfaces defined by a bearing race 118i of the blade 118 to provide excellent blade stability with minimum frictional contact between the blade 118 and the housing 114.

Specific details of the bearing race 118i of the blade 118 and the bearing structure 116 of the blade housing 114 are found in U.S. Pat. No. 7,000,325 to Whited. The '325 patent is assigned to the assignee of the present invention and is incorporated in its entirety by reference herein.

The blade housing bearing structure 116 establishes a horizontal plane HP (schematically shown in FIGS. 6 and 7) that defines a plane of rotation of the blade 118. The horizontal plane HP of the blade housing 114 is substantially orthogonal to the axis of rotation A-A of the blade 118 and the vertical center axis of the blade housing 114. The horizontal plane of the blade housing 114 is also substantially parallel to the centerline H-H of the handle assembly 112.

Cone-Shaped Rotary Blade 118

In one exemplary embodiment, the annular knife blade 118 is a generally a cone-shaped rotary knife blade. The blade 118 is typically fabricated of steel tubing and is subject to annealing for toughness and durability. In one exemplary embodiment, and not by way of any limitation or restriction, one set of suitable dimensional values for the cone-shaped blade 118 are as follows:

Height of blade—H=0.675 in.
Outer diameter of blade—OD=1.407 in.
Inner diameter of second end (gear drive end) of blade—ID=1.250 in.
Inner diameter/cutting opening of first end (blade end) of blade—CO=0.73 in.
Width of blade—W=0.071 in.
Cutting angle of first end of blade with respect to blade central axis V-V—$\alpha$=28°
Angle of tapered portion of cutting edge with respect to horizontal axis—$\beta$=35°

The cone-shaped blade 118 advantageously used in the present invention, compared to typical rotary knife blades, is characterized by: 1) a relatively large height H of blade 118; 2) a relatively small cutting opening of blade end 118b; 3) an aggressive, relatively small, vertical cut angle $\alpha$; 4) a relatively large ratio R1 of the height H compared to an outer diameter OD of the blade; 5) a relatively small ratio R2 of the cutting opening CO of the blade end 118b compared to an inner diameter ID of the second end 118d (gear drive end opening).

Regarding characteristic 1 above, in one exemplary embodiment, the height H of the cone-shaped blade 118 is preferably in a range of 0.5-1.0 in. In the exemplary dimensions recited above, H=0.675 in. In typical rotary blades, the height H is relatively small, on the order of, for example, 0.25 in.

Regarding characteristic 2 above, in one exemplary embodiment, the cutting opening CO defined by the cutting edge 118h of the cone-shaped blade 118 is in a range of 0.50-1.00 in. In the exemplary dimensions recited above, CO=0.73 in. In typical rotary blades, the cutting opening is relatively large, on the order of, for example, 5.0 in.

Regarding characteristic 3 above, in one exemplary embodiment, cutting angle $\alpha$ with respect to the central or vertical axis (shown as V-V in FIG. 11) of the blade 118 is relatively small, making the blade cutting configuration upright and aggressive, as opposed to having a more shallow vertical cutting angle and cutting configuration. The vertical cutting angle $\alpha$ of the cone-shaped blade 118 is preferably in a range of 20-40°. In the exemplary dimensions recited above, the vertical cutting angle $\alpha$=28°. In typical rotary blades, the vertical cutting angle is larger, on the order of, for example, 45° or more. In FIG. 11, for ease of illustration, the vertical cutting angle $\alpha$ is shown with respect to axes labeled V'-V' which, of course, are parallel to the blade central vertical axis V-V.

Regarding characteristic 4 above, in one exemplary embodiment, the ratio R1 of H/OD for the cone-shaped blade 118 preferably may be on the order of 40-60%. In the exemplary dimensions recited above, the ratio R1=0.675 in./1.407 in.=0.48=48%. In typical rotary blades, the ratio R1 of blade height H to outer diameter OD is relatively small in that the blades tend to have relatively large outer diameters, for example, in one typical rotary blade, the outer diameter is 5.0 in., while the height is relatively small, for example, 0.25 in., resulting in a small ratio R1=0.25/5.0 in.=0.05=5%.

Regarding characteristic 5 above, in one exemplary embodiment, the ratio R2 of CO/OD for the cone-shaped blade 118 preferably may be on the order of 50-70%. In the exemplary dimensions recited above, the ratio R2=0.73 in./1.25 in.=0.58=58%. In typical rotary blades, the ratio R2 of cutting opening CO to the inner diameter ID of the gear end 118d of the blade is very close to 1.0 because the blades tend to have relatively large cutting openings and the inner diameters of the gear end of the blade are only marginally larger, thus the ratio R2 is close to 1.0. For example, in one typical rotary blade, the cutting opening is 4.43 in., while the inner diameter at the gear end is 4.90 in., resulting in a ratio R2=4.43 in./4.90 in.=0.90=90%.

Advantageously, the configuration of the cone-shaped blade 118 of the present invention is especially suited to facilitate removal or trimming of the damaged portion 34 of the metatarsal pad 20 quickly and efficiently, while allowing a maximum or close to maximum amount of the undamaged portion 36 to remain after the trimming operation to thereby maximize the commercial and food value of the trimmed pawl 2. That is, the method and the cone-shaped rotary knife blade 118 of the present invention facilitates an operator removing a trimmed layer 40 (best seen in FIGS. 17A & 17B) of the metatarsal pad 20 wherein a cut width CW and cut length CL of the trimmed layer 40 encompass a rectangular area that does not extend significantly beyond the peripheral edge or border 34c of the undesirable portion 34 of the metatarsal pad. Stated another way, as best seen in FIG. 17B, the cut width CW and cut length CL of the trimmed layer 40 substantially correspond to a horizontal extent HE and vertical extent VE of the undesirable portion 34 of the metatarsal pad 20.

Figure 17A:
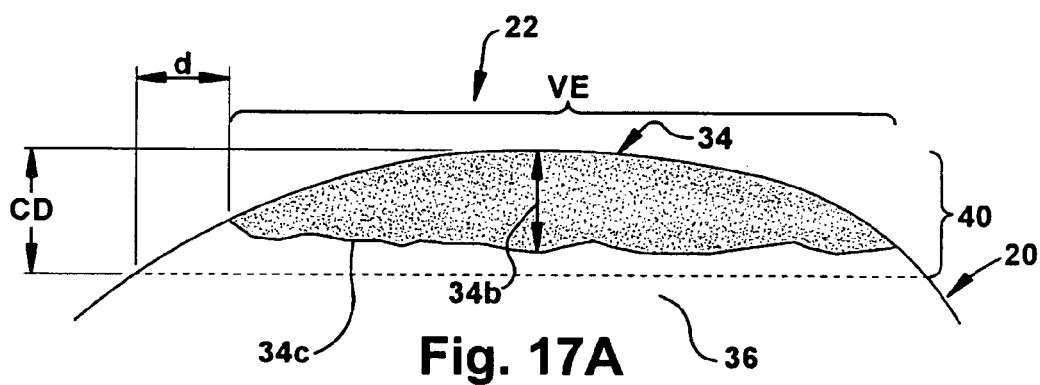
FIG. 17A is a schematic side sectional view of a profile of trimmed layer of the metatarsal pad including the removed undesirable portion.
Figure 17B:
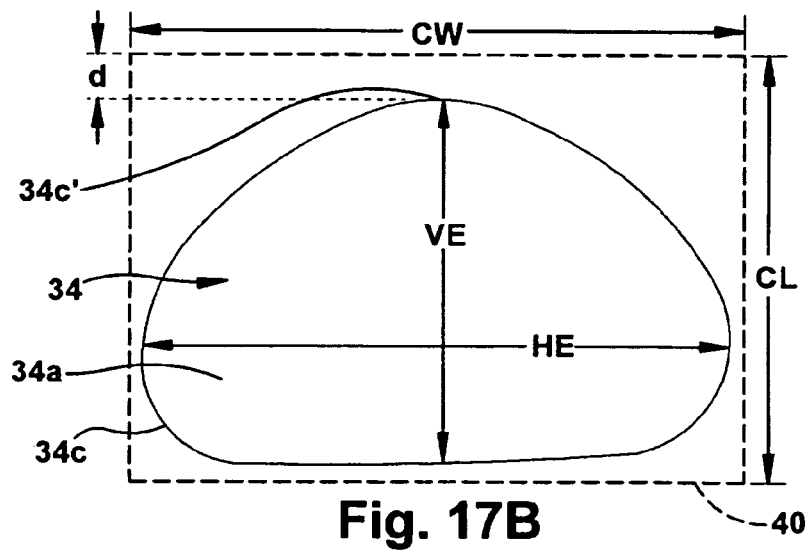
FIG. 17B is a schematic top plan view of the trimmed layer of the metatarsal pad of FIG. 17A.

Additionally, as can best be seen in FIG. 17A, a cut depth CD of the trimmed layer 40 does not extend significantly beneath a maximum depth 34b of the damaged portion 34 of the pad 20. The maximum depth 34b of the undesirable portion 34 may be judged by the operator depending on, among other things, the size and discoloration of the surface region 34a of the undesirable portion 34. As should be understood, since the operator may not be able to accurately judge the depth 34b of the undesirable portion 34, it may be necessary to repeat the trimming operation and trim a second or third layer 40 until the operator can verify that no part of the undesirable portion 34 remains and all of the remaining metatarsal pad 20 is an undamaged portion 36, free from damage or discoloration. As the operator becomes more skilled and proficient in judging the maximum depth 34b of the undesirable region 34, mistakes as to the undesirable portion depth 34a should decrease, reducing the instances of repeating the trimming step.

The relatively small outer diameter OD of the cone-shaped blade 118 and the cutting opening CO, combined with the aggressive vertical cutting angle $\alpha$ of the blade facilitate the trimming process. The small outer diameter OD of the blade 118 makes it easier to manipulate the rotary knife 118 so that the blade 118 is properly positioned for trimming. For example, the small OD of the blade 118 makes it easier to get the blade between the toes 28, 30, 32 of the paw 12. Additionally, the small cut opening CO of the blade 118 makes a portion of the cutting edge 118g that makes contact with the metatarsal pad 20 relatively narrow resulting in a desirable small cut width CW that is substantially congruent with a horizontal extend HE (FIG. 17B) of the damaged region 34. Having a larger blade cutting opening CO would create a flatter and wider cut area resulting in a undesirably wide trim layer 40 that would substantially exceed the horizontal extent HE of the damaged portion 34. Additionally, the vertical cutting angle α of the blade is an aggressive cut angle that allows accurate cutting under the maximum depth 34b of the undesirable portion 34 without removing excessive amounts of the underlying and/or surrounding undamaged portions of the metatarsal pad 20. That is, the aggressive cut angle α makes it easier for the operator to manipulate the rotary knife 100 to trim to an appropriate cut depth CD to remove the undesirable portion 34, generally in one trimming operation, without trimming surrounding good metatarsal pad tissue 36.

Method of Trimming Undesirable Portion 34 from Metatarsal Pad 20

The rotary knife 100 may advantageously be used to practice the method of the present invention, namely, trimming a layer 40 from the metatarsal pad 20 that corresponds to a damaged and/or discolored portion 34 (undesirable portion) of the metatarsal pad 20 of a chicken paw 12. As used herein in this application, including the claims, chicken paws 12 will be defined as and deemed to include both chicken paws 12 and chicken feet 14.

The method of the present invention provides for trimming an undesirable portion 34 of a metatarsal pad 20 of a chicken paw 12 that is faster than hand trimming, that is suitable for use by operators of the rotary knife 100 with minimal training, that is easier and more ergonomically correct than hand trimming, and that facilitates trimming the undesirable portion 34 of the metatarsal pad 20 without substantial removal of undamaged portions 36 of the pad.

The undesirable portion 34 of the metatarsal pad 20 is characterized by a surface region 34a and a depth 34b. The surface region 34a corresponds to a size and shape of an outer surface of the metatarsal pad 20 that is discolored or otherwise damaged from burning or the like. Typically, the surface region 34a of the undesirable portion 34 generally conforms in size and shape to the ground contacting surface 22 of the metatarsal pad 20, that is, the portion of the pad 20 that contacts the ground when the chicken is standing or walking. The depth 34b of the undesirable portion 34 will depend on many factors including the age of the chicken 10, the chicken's diet, the cleanliness of the chicken's cage or housing, etc. Typically, as can best be seen in the schematic representation of a cross section of the metatarsal pad 20, the depth 34b of the undesirable portion will vary from a minimum depth adjacent a periphery or edge 34c of the undesirable portion 34. A maximum depth of the undesirable portion 34 for a typical chicken paw 12 may be on the order of 0.025-0.3 inch.

Figure 18:
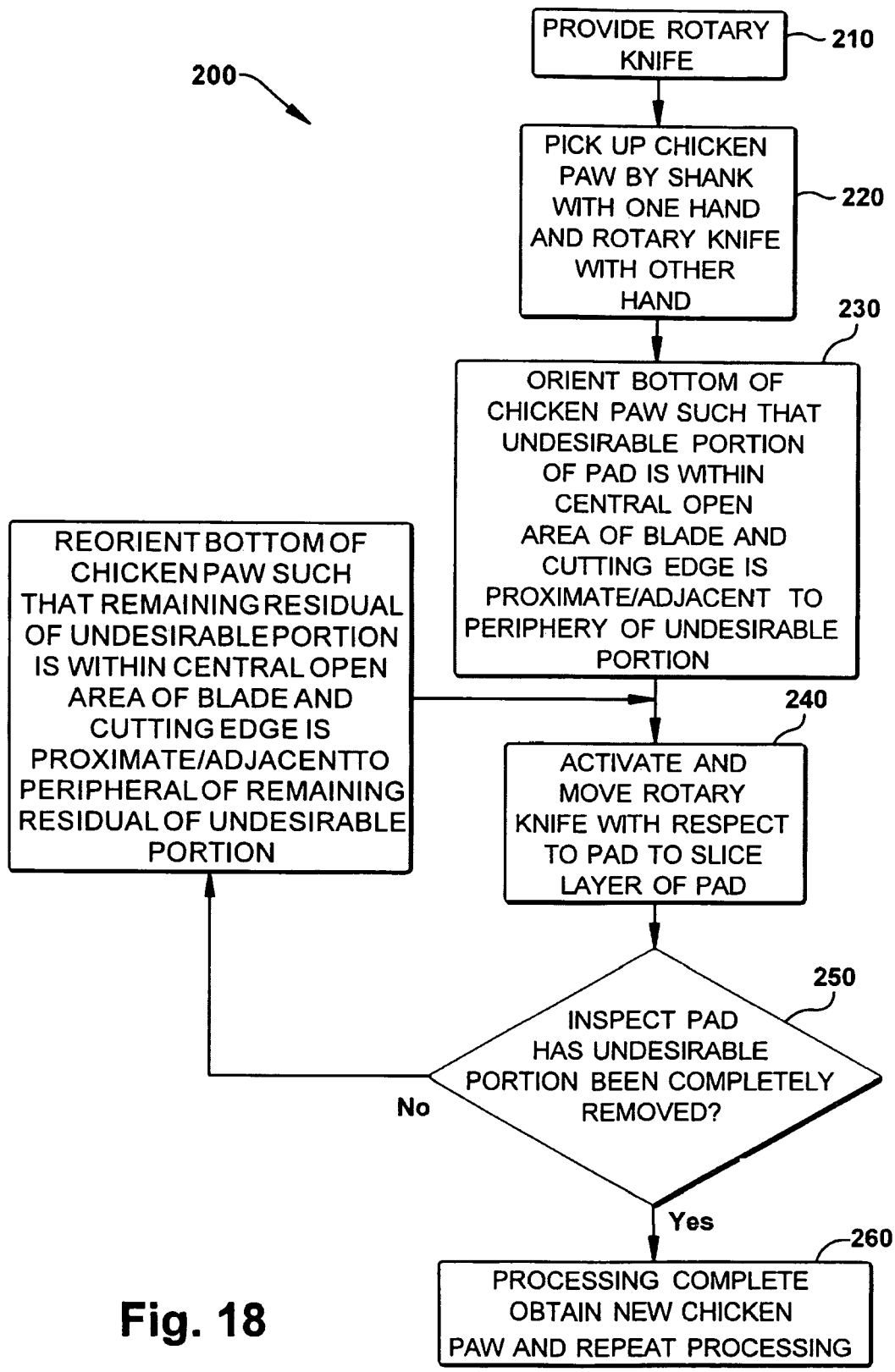
FIG. 18 is a schematic flow chart of an exemplary embodiment of the method of trimming an undesirable portion of a metatarsal pad of a chicken paw using a power operated rotary knife.

FIG. 18 depicts a flow chart illustrating one exemplary embodiment of the method of the present invention. The method is shown generally at 200 in FIG. 18. At step 210, a power operated rotary knife 100 is provided to an operator. The power operated rotary knife 100 includes an annular knife blade 118 rotatable about the central axis A-A and defining a central open area 119, a blade housing 114 supporting the blade 118 for rotation about the blade central axis A-A, and a handle assembly 112 extending from the blade housing 114 including a drive member 126 engaging and rotating the blade 118, the blade 118 including an annular body 118a with a blade section 118c at a first axial end 118b of the blade 118 and gear teeth 118e engaged by the blade housing drive member 126 at a second axial end 118d of the blade 118, the blade section 118c including a lip 118f extending below a lower surface 117 of the blade housing 114 and radially inwardly toward the blade central axis V-V, the lip 118f defining a radially inner surface 118g having cutting edge 118 h at a distal end.

At step 220, the operator picks up a chicken paw 12 by its shank 16 with one hand and grasps the rotary knife handpiece 122 with the other hand 125a. At step 230, the operator orients a bottom 12a of the chicken paw 12 with respect to the rotary knife blade 118 such that the undesirable portion 34 of the metatarsal pad 20 is within the central open area 119 defined by the blade and the cutting edge 118h of the blade 118 is positioned substantially at or proximate to an edge or periphery 34c of the undesirable portion 34. Ideally, the operator would position the cutting edge 118h of the blade 118 with the periphery 34c of the undesirable portion 34, then cut downwardly and rearwardly (in a direction toward the operator) such that the removed layer 40 only includes the undesirable portion 34. However, in reality, most operators will not have the time or dexterity to perfectly align the cutting edge 118h of the blade 118 with the periphery 34c of the undesirable portion.

Figure 12:
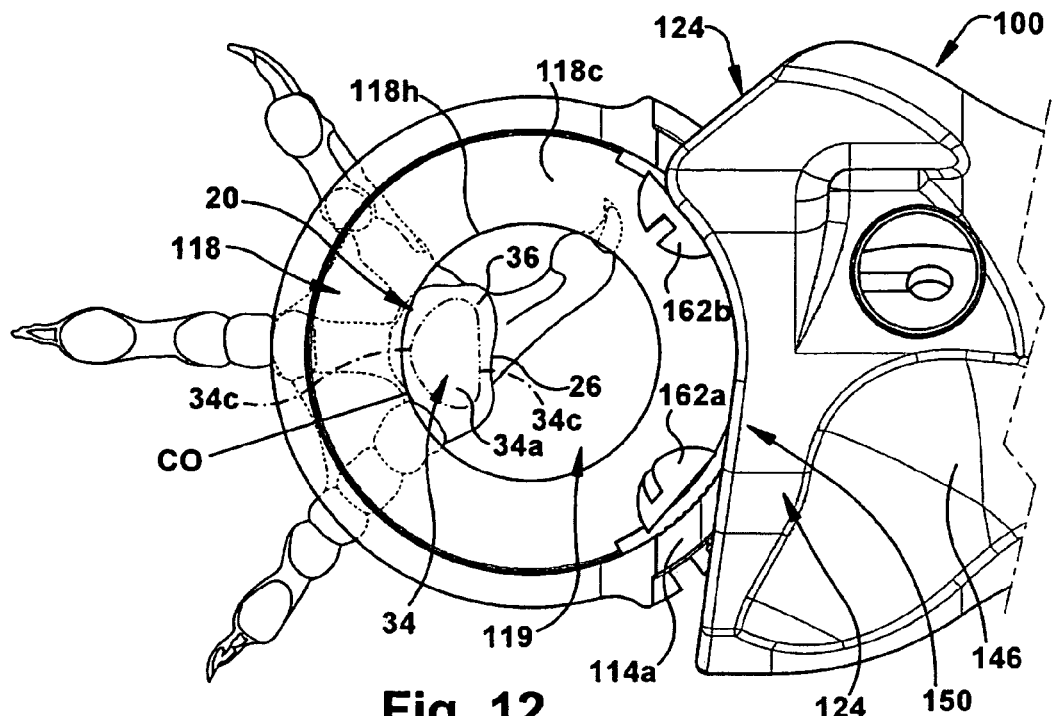
FIG. 12 is a schematic top plan view of a chicken paw positioned relative to the rotary knife of FIG. 4 to commence removing an undesirable portion of a metatarsal pad of the chicken paw of FIG. 2.
Figure 13:
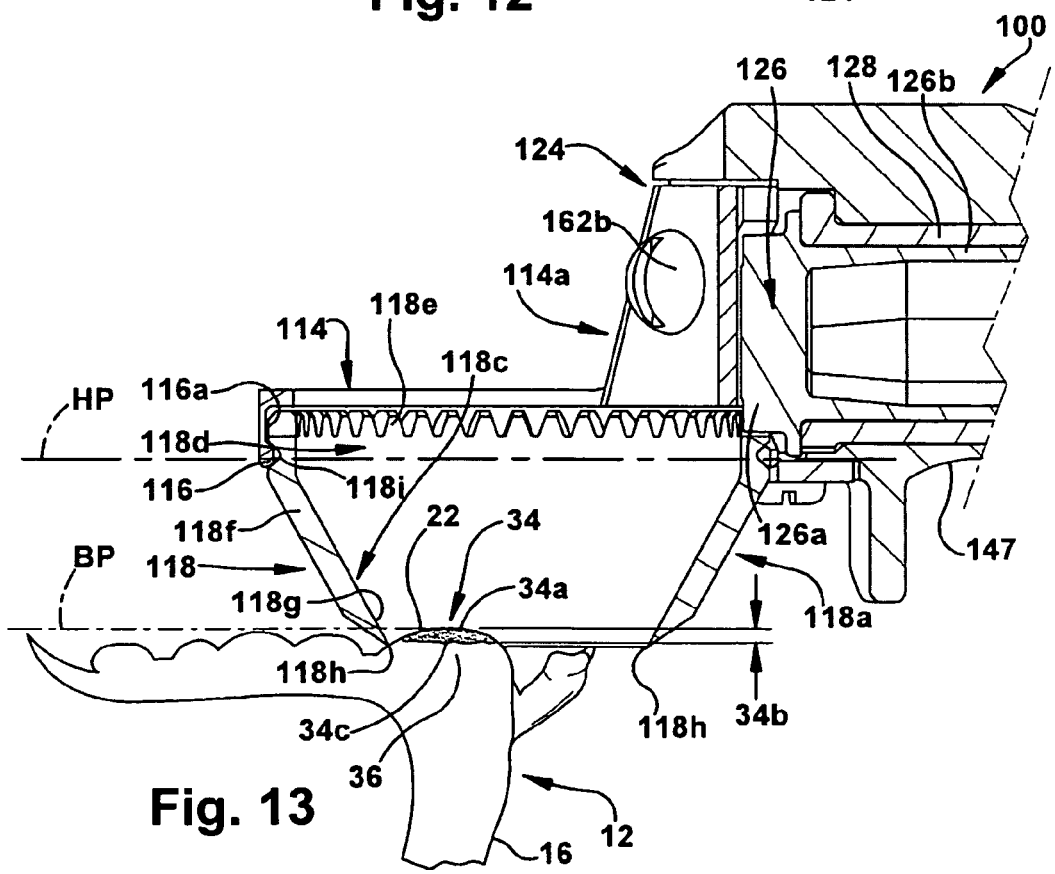
FIG. 13 is a schematic side sectional view of the chicken paw and rotary knife of FIG. 4 with the chicken paw positioned relative to the rotary knife to commence removing the undesirable portion of the metatarsal pad of the chicken paw of FIG. 2.

Rather, as is shown in FIGS. 12 & 13 and as is illustrated in FIGS. 17A & 17B, the trimmed layer 40 is going to be slightly larger than the undesirable portion 34. That is, a cut width CW of the layer 40 will typically slightly exceed the horizontal extent HE of the undesirable portion 34, a cut length CL of the layer 40 will typically slightly exceed the vertical extent VE of the undesirable portion 34, and a cut depth CD will typically slightly exceed the maximum depth 34b of the undesirable portion 34. Thus, by "positioned at or proximate to an edge or periphery" it is meant that either the cutting edge 118h of the blade 118 is aligned with the periphery 34c of the undesirable portion 34 or, as is illustrated in FIGS. 12 and 13, the cutting edge 118h is aligned a distance d (FIGS. 17A & 17B) that is slightly forward (that is, away the operator) of a forward portion 34c' (FIG. 17B) of the periphery 34c of the undesirable portion 34. The distance d that the cutting edge 118h is forward of the forward portion 34c' of the periphery will typically be very small, for example, on the order of 0.1 in. or less.

By the same token by "within the central open area 119", it is meant that at least the forward portion 34c' of the peripheral edge 34a of the undesirable portion 34 is visible to the operator through the central open area 119 such that the cutting edge 118h is either aligned with the periphery 34c of the undesirable portion 34 or, as is illustrated in FIGS. 12 and 13, the cutting edge 118h is aligned a distance d that is slightly forward (that is, away the operator) of the forward portion 34c' of the periphery 34c of the undesirable portion 34. Another way to state the forgoing is that the at least the forward portion 34c' of the peripheral edge 34a of the undesirable portion 34 is visible to the operator through the cutting opening CO of the cutting edge 118h such that the cutting edge 118h is aligned with the periphery 34c of the undesirable portion 34 or, as is illustrated in FIGS. 12 and 13, the cutting edge 118h is aligned a distance d that is slightly forward (that is, away the operator) of the forward portion 34c' of the periphery 34c of the undesirable portion 34.

It should be recognized that in terms of relative movement between the rotary knife 100 and the chicken paw 12 either that either the knife 100, the chicken paw 12 or both may be moved with respect to the other. That is, the chicken paw 12 may be stationary and the rotary knife 100 moved with respect to the chicken paw 12, the rotary knife 100 may be stationary and the chicken paw 12 moved with respect to the rotary knife 100, or both the rotary knife 100 and the chicken paw 12 may be moved.

Figure 14:
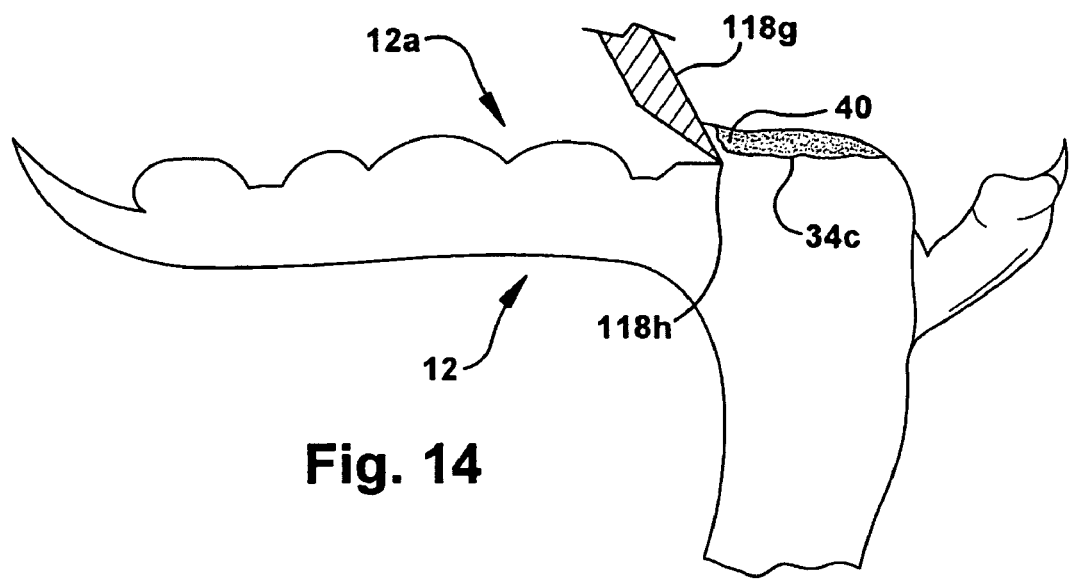
FIG. 14 is a schematic side sectional view of a cutting edge of the rotary knife of FIG. 4 showing an initiation of trimming a layer of the metatarsal pad that includes the undesirable portion.
Figure 15:
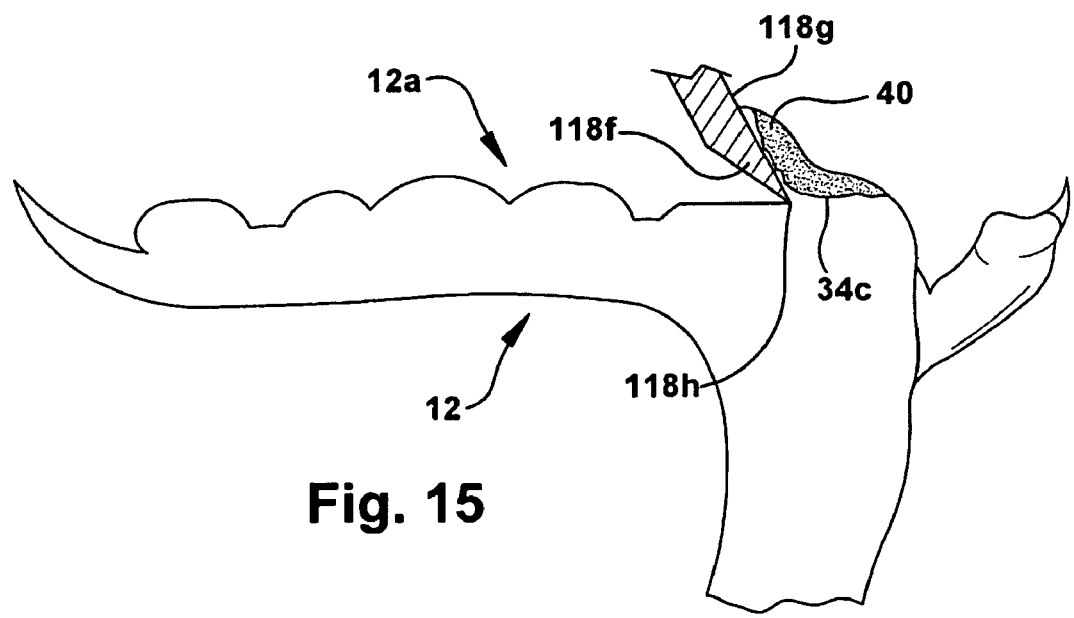
FIG. 15 is a schematic side sectional view of the cutting edge of the rotary knife of FIG. 4 showing continuation of trimming of a layer of the metatarsal pad that includes the undesirable portion.
Figure 16:
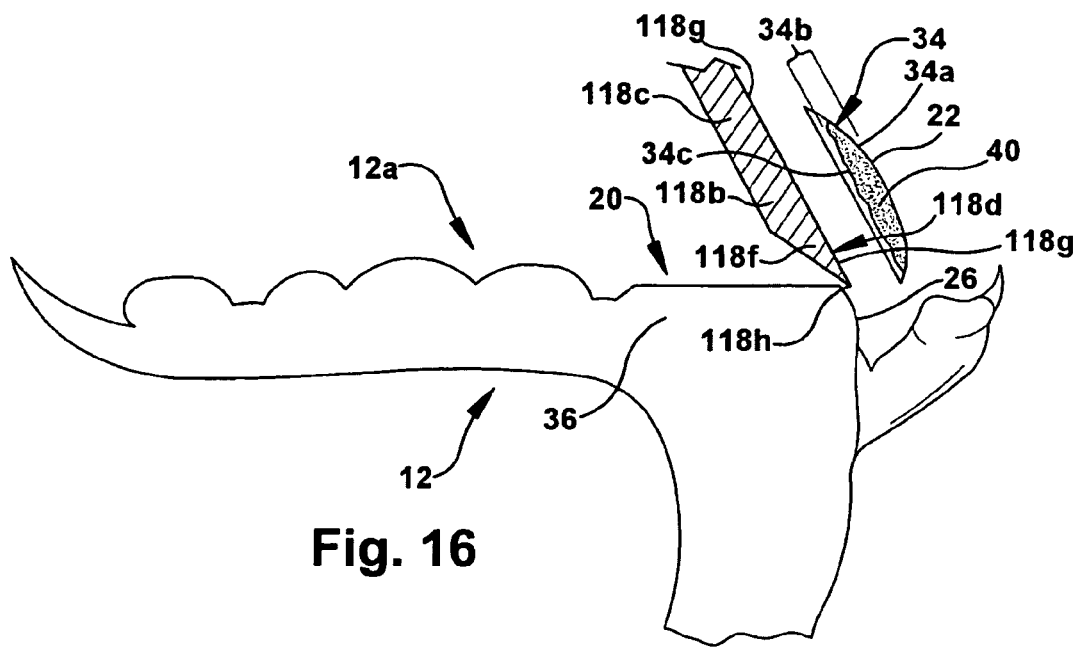
FIG. 16 is a schematic side sectional view of the cutting edge of the rotary knife of FIG. 4 showing completion of trimming of a layer of the metatarsal pad that includes the undesirable portion.

At step 240, the operator actuates and moves the rotary knife 100 with respect to the metatarsal pad 20 such that the cutting edge 118h of the blade 118 trims or slices a layer 40 of the metatarsal pad 34 thereby removing at least part of the undesirable portion 34. It should be understood that depending on the nature of the processing operation and management directions, the rotary knife 100 may be configured to operate continuously, thereby removing the necessity of starting and stopping the knife before and after each trimming operation. As the rotary knife 100 is moved with respect to the metatarsal pad 20, as can be seen in FIGS. 14-16, the trimmed layer 40 of the pad 20 rides upwardly along the radially inner surface 118g of the blade lip 118f and moves through the central opening 119. The movement of the rotary knife 100 with respect to the metatarsal pad 34 is in a direction that is substantially orthogonal to the central axis of rotation A-A and the central vertical axis V-V of the blade 118 and substantially parallel to a plane BP (FIG. 13) defined by the bottom 12a of the chicken paw 12. It should be recognized, of course, that when it is said that the operator actuates and moves the rotary knife 100 with respect to the chicken paw metatarsal pad 20, the operator may, at his or her choice, move the rotary knife 100 while keeping the chicken paw 12 stationary, or he or she may move the chicken paw 12 while keeping the rotary knife 100 stationary, or he or she may move both the chicken pay 12 and the rotary knife 100. The phrase "moves the rotary knife with respect to the metatarsal pad" shall be understood to cover all three of the options noted above. Individual operator preference will determine which movement or combination of movements is used.

At step 250, the operator inspects the metatarsal pad 20 to determine if the undesirable portion 34 has been completely removed. If the answer to step 240 is yes, then at step 260, the processing of the chicken paw 12 is complete and the operator picks up another chicken paw for processing. If the answer to step 250 is no, then at step 260, the operator reorients the bottom 12a of the chicken paw 12 such that a remaining residual of the undesirable portion 34 is within the central opening 119 of the blade 118 and the cutting edge 118h of the blade 118 is at positioned at an edge or periphery of the remaining residual of the undesirable portion 34. Steps 240 and 250 are repeated as many times as necessary until the undesirable portion 34 is completely removed.

While the present invention has been described with a degree of particularity, it is the intent that the invention include all modifications and alterations from the disclosed embodiments falling within the spirit or scope of the appended claims.

The invention claimed is:

1. A method for trimming an undesirable portion of a metatarsal pad of a chicken paw using a power operated rotary knife, the steps of the method comprising:
   a) providing a power operated rotary knife including an annular knife blade rotatable about a central axis and defining a central open area, a blade housing supporting the blade for rotation about the blade central axis, and a handle assembly extending from the blade housing including a drive member engaging and rotating the blade, the blade including an annular body with a blade section at a first axial end of the blade and gear teeth engaged by the blade housing drive member at a second axial end of the blade, the blade section including a lip extending below a lower surface of the blade housing and radially inwardly toward the blade central axis, the lip defining a radially inner surface having cutting edge at a distal end;
   b) moving one of the rotary knife and the chicken paw with respect to the other to position the rotary knife with respect to a bottom of the chicken paw such that at least a part of the undesirable portion of the metatarsal pad is within the central open area of the blade and the cutting edge of the blade is proximate to a periphery of the undesirable portion; and
   c) moving one of the rotary knife and the chicken paw with respect to the other such that the cutting edge of the blade slices a layer of the metatarsal pad thereby removing at least part of the undesirable portion.

2. The method of claim 1 further including the step of: d) inspecting the metatarsal pad to ascertain if the undesirable portion has been completely removed.

3. The method of claim 2 further including the step of: e) if the undesirable portion has not be completely removed, repeating the steps b and c of claim 1 above.

4. The method of claim 1 wherein in the steps b and c, the chicken paw is stationary and the rotary knife is moved with respect to the chicken paw.

5. The method of claim 4 wherein movement of the rotary knife is in a direction of movement that is substantially orthogonal to the central axis of the blade and substantially parallel to a plane defined by the bottom of the chicken paw.

6. The method of claim 1 wherein in the steps b and c, the rotary knife is stationary and the chicken paw is moved with respect to the rotary knife.

7. The method of claim 6 wherein movement of the chicken paw is in a direction of movement that is substantially orthogonal to the central axis of the blade and substantially parallel to a plane defined by the bottom of the chicken paw.

8. The method of claim 1 wherein in the steps b and c, both the rotary knife and the chicken paw are moved.

9. The method of claim 8 wherein movement of the rotary knife is in a direction of movement that is substantially orthogonal to the central axis of the blade and substantially parallel to a plane defined by the bottom of the chicken paw.

10. The method of claim 1 wherein a thickness of the layer of the metatarsal pad cut is approximately 0.025 to 0.3 inch.

11. The method of claim 1 wherein the rotary knife blade is cone-shaped with a vertical cutting angle of the rotary knife blade being in a range of 20° to 40° when measured with respect to a central vertical axis of the blade.

12. The method of claim 1 wherein the rotary knife blade is cone-shaped with a height of the blade when measured with respect to a central vertical axis of the blade being in a range of 0.5-1.0 inch.

13. The method of claim 1 wherein the rotary knife blade is cone-shaped with a cutting opening defined by the cutting edge of the blade being in a range of 0.50-1.00 inch.

14. The method of claim 1 wherein the rotary knife blade is cone-shaped with a ratio of a height of the blade to an outer diameter (OD) of the blade being in a range of 40-60%.

15. The method of claim 1 wherein the rotary knife blade is cone-shaped with a ratio of a cutting opening of the cutting edge of the blade to an outer diameter (OD) of the blade being in a range of 50-70%.

16. A method of cutting away a damaged portion of a metatarsal pad of a chicken paw using a power operated rotary knife, the steps of the method comprising:
   a) providing a power operated rotary knife including an annular knife blade rotatable about a central axis and defining a central open area, a blade housing supporting the blade for rotation about the blade central axis, and a handle assembly extending from the blade housing including a drive member engaging and rotating the blade, the blade including an annular body with a blade section at a first axial end of the blade and gear teeth engaged by the blade housing drive member at a second axial end of the blade, the blade section including a lip extending below a lower surface of the blade housing and radially inwardly toward the blade central axis, the lip defining a radially inner surface having cutting edge at a distal end;

b) moving one of the rotary knife and the chicken paw with respect to the other to position the rotary knife with respect to a bottom of the chicken paw such that at least a part the damaged portion of the metatarsal pad is within a cutting opening defined by the cutting edge of the blade and the cutting edge of the blade is proximate to a periphery of the damaged portion; and c) moving one of the rotary knife and the chicken paw with respect to the other such that the cutting edge of the blade cuts the metatarsal pad thereby removing at least part of the damaged portion.

17. The method of claim 16 wherein the rotary knife blade is cone-shaped with a vertical cutting angle of the rotary knife blade being in a range of 20° to 40° when measured with respect to a central vertical axis of the blade.

18. The method of claim 16 wherein the rotary knife blade is cone-shaped with a height of the blade when measured with respect to a central vertical axis of the blade being in a range of 0.5-1.0 inch wt.

19. The method of claim 16 wherein the rotary knife blade is cone-shaped with a cutting opening defined by the cutting edge of the blade being in a range of 0.50-1.00 inch.

20. The method of claim 16 wherein the rotary knife blade is cone-shaped with a ratio of a height of the blade to an outer diameter (OD) of the blade being in a range of 40-60%.

21. The method of claim 16 wherein the rotary knife blade is cone-shaped with a ratio of a cutting opening of the cutting edge of the blade to an outer diameter (OD) of the blade being in a range of 50-70%.

* * * * *